(12) United States Patent
Hallman et al.

(10) Patent No.: US 10,508,731 B2
(45) Date of Patent: Dec. 17, 2019

(54) APPARATUS AND METHOD FOR MANAGING PINCH LOADS ON A GEAR

(71) Applicant: General Electric Company, Schenectady, NY (US)

(72) Inventors: Darren Lee Hallman, Scotia, NY (US); Donald Albert Bradley, Royal Oak, MI (US); Changjie Sun, Clifton Park, NY (US); Bugra Han Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 269 days.

(21) Appl. No.: 15/399,291

(22) Filed: Jan. 5, 2017

(65) Prior Publication Data

US 2018/0187773 A1 Jul. 5, 2018

(51) Int. Cl.
| | |
|---|---|
| *F16H 1/28* | (2006.01) |
| *F16H 57/08* | (2006.01) |
| *F02C 7/36* | (2006.01) |
| *F16H 57/00* | (2012.01) |

(52) U.S. Cl.
CPC ............ *F16H 57/08* (2013.01); *F02C 7/36* (2013.01); *F16H 1/28* (2013.01); *F05D 2220/323* (2013.01); *F05D 2240/54* (2013.01); *F05D 2260/40311* (2013.01); *F16H 2057/0087* (2013.01); *F16H 2057/085* (2013.01)

(58) Field of Classification Search
CPC ...... F16H 57/08; F16H 1/28; F16H 2057/085; F16H 2057/0087; F02K 3/06; F02C 7/36; Y02T 50/671; F05D 2240/54; F05D 2220/323; F05D 2260/40311
See application file for complete search history.

(56) References Cited

U.S. PATENT DOCUMENTS

| | | | |
|---|---|---|---|
| 8,123,413 B2 | 2/2012 | Tambe et al. |
| 8,172,717 B2 | 5/2012 | Lopez et al. |
| 8,198,744 B2 | 6/2012 | Kern et al. |
| 8,235,861 B2 | 8/2012 | Lopez et al. |
| 8,287,423 B2 | 10/2012 | Lopez et al. |
| 8,298,114 B2 | 10/2012 | Lopez et al. |
| 8,333,678 B2 | 12/2012 | McCune |
| 8,459,872 B2 | 6/2013 | Nies et al. |

(Continued)

FOREIGN PATENT DOCUMENTS

EP 2803436 A2 11/2014

OTHER PUBLICATIONS

Bahgat et al., "On the Dynamic Gear Tooth Loading of Planetary Gearing as Affected by Bearing Clearances in High-Speed Machinery", Journal of Mechanisms, Transmissions, and Automation in Design, vol. 107, Issue: 3, pp. 430-436, Sep. 1, 1985.

(Continued)

*Primary Examiner* — David J Hlavka
(74) *Attorney, Agent, or Firm* — Armstrong Teasdale LLP (57) ABSTRACT

A planet gear includes a pin and an annular planet gear rim. The pin has a pin radius. The pin includes a pin outer surface. The annular planet gear rim has an inner radius and an outer radius. The annular planet gear rim includes an inner surface and an outer surface. The inner surface and the pin outer surface define a clearance therebetween. The clearance is greater than 0 when a radial force is applied to the planet gear.

17 Claims, 4 Drawing Sheets

(56) References Cited

U.S. PATENT DOCUMENTS

| | | |
|---|---|---|
| 8,491,435 B2 | 7/2013 | Ghanime et al. |
| 8,506,446 B2 | 8/2013 | Minadeo et al. |
| 8,517,672 B2 | 8/2013 | McCooey |
| 8,550,955 B2 | 10/2013 | Erno et al. |
| 8,550,957 B2 | 10/2013 | Erno et al. |
| 8,574,118 B2 | 11/2013 | McCune |
| 8,657,714 B1 | 2/2014 | Ghanime et al. |
| 8,696,314 B2 | 4/2014 | Mashue et al. |
| 8,727,632 B2 | 5/2014 | Do et al. |
| 8,777,802 B2 | 7/2014 | Erno et al. |
| 8,857,192 B2 | 10/2014 | Huang et al. |
| 8,904,746 B2 | 12/2014 | Fang et al. |
| 2011/0212808 A1* | 9/2011 | Pabst .................. C21D 7/06 475/348 |
| 2017/0089218 A1* | 3/2017 | Hasting ................ F16C 33/34 |
| 2017/0108084 A1* | 4/2017 | Chmylkowski ........ F01D 15/12 |
| 2017/0167540 A1* | 6/2017 | Hasting ................ F02C 3/107 |
| 2017/0219079 A1* | 8/2017 | Niergarth .............. F02C 7/36 |
| 2018/0016939 A1* | 1/2018 | Klaus ................... F01D 25/04 |

OTHER PUBLICATIONS

Lee et al., "A study on the dynamic characteristics of an epicyclic gear trains supported with journal bearing", Transactions of the Korean Society of Mechanical Engineers A, vol. 22, Issue: 1, pp. 198-205, 1998.

* cited by examiner

APPARATUS AND METHOD FOR MANAGING PINCH LOADS ON A GEAR

BACKGROUND

The field of the disclosure relates generally to systems and methods for managing loads in a gearbox and, more particularly, to an apparatus and method for managing pinch loads on a planet gear with journal or fluid film bearings.

Aircraft engines typically include a fan, a low pressure compressor, and a low pressure turbine rotationally coupled in a series configuration by a low pressure shaft. The low pressure shaft is rotationally coupled to the low pressure turbine and a power gear box. The power gear box includes a plurality of gears and is rotationally coupled to the low pressure fan and low pressure compressor. The gears include a gear rim surrounding a journal bearing or fluid film bearing. The journal bearing includes a pin surrounded by a fluid film. The fluid film allows the gear rim to rotate around the stationary pin. Aircraft engines may generate significant torsional loads on the low pressure shaft. Torsional loads on the low pressure shaft can exert torsional forces on the gears within the power gear box. Additionally, these torsional loads transferred through the planet gears may exert unevenly distributed loads on the journal bearings within the gears. These unevenly distributed loads result in pinching the pin with the gear rim which will induce higher contact stresses between the gear rim and the pin and reduce the reliability of the journal bearings as well as the power gear box.

BRIEF DESCRIPTION

In one aspect, a planet gear includes a pin and an annular planet gear rim. The pin has a pin radius. The pin includes a pin outer surface. The annular planet gear rim has an inner radius and an outer radius. The annular planet gear rim includes an inner surface and an outer surface. The inner surface and the pin outer surface define a clearance therebetween. The clearance is greater than 0 when a radial force is applied to the planet gear.

In another aspect, a gear assembly includes a sun gear and a ring gear. The gear assembly also includes a plurality of planet gears coupled to the ring gear and the sun gear. Each planet gear of the plurality of planet gears includes a pin and an annular planet gear rim. The pin has a pin radius. The pin includes a pin outer surface. The annular planet gear rim has an inner radius and an outer radius. The annular planet gear rim includes an inner surface and an outer surface. The inner surface and the pin outer surface define a clearance therebetween. The clearance is greater than 0 when a radial force is applied to the planet gear.

In yet another aspect, a method of manufacturing a planet gear is provided. The planet gear includes a planet gear rim circumscribing a bearing pin. The planet gear has an inner radius, an outer radius, a thickness, a Young's modulus of elasticity, a bending stress neutral axis radius, and a width. The bearing pin has a bearing pin radius. The inner radius and the bearing pin radius define a clearance therebetween. The inner radius and the bearing pin radius further define a change in clearance therebetween when a radial force is applied to the planet gear. The method includes determining the radial force applied to the planet gear. The method also includes determining the bending stress neutral axis radius, the thickness, the Young's modulus of elasticity, and the width based on the radial force. The method further includes determining the clearance based on the bending stress neutral axis radius, the thickness, the Young's modulus of elasticity, and the width based on the radial force. The method also includes determining the bearing pin radius based on the clearance. The method further includes determining the change in clearance and a gear pinch ratio based on the bending stress neutral axis radius, the radial force, the thickness, the width, the clearance, and the Young's Modulus of elasticity. The method also includes manufacturing the planet gear based on the gear pinch ratio.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the gear described herein manage resultant tangential and radial loads in a power gearbox in a turbomachine, e.g. an aircraft engine. The planet gear includes a planet gear rim circumscribing a journal or fluid film bearing. The journal or fluid film bearing includes a pin circumscribed by the planet gear rim and a fluid disposed between the pin and the planet gear rim. The distance between the pin and the planet gear rim is defined as the clearance. The planet gear rim rotates about the journal or fluid film bearing. A plurality of gear teeth is disposed circumferentially about an outer radial surface of the planet gear rim. A sun gear and a low pressure power shaft are configured to rotate the planet gear through a plurality of complementary teeth circumferentially spaced about a radially outer periphery of the sun gear. The low pressure power shaft exerts torsional forces on the sun gear which exerts forces through the planet gear balanced by equal and opposite forces on the ring gear and creates a reaction force through the the the pin. The planet gear rim of deflects and deforms due to the torsional forces. The planet gear described herein has been cooperatively designed with the journal or fluid film bearing such that the clearance is not zero when torsional loads are exerted on the planet gear. Maintaining the clearance above zero improves the load capacity, reduces heat generation, and increases the reliability of the planet gear and the power gear box. Furthermore, the planet gear described herein reduces the weight of the aircraft by reducing the amount of material in the planet gear.

Figure 1:
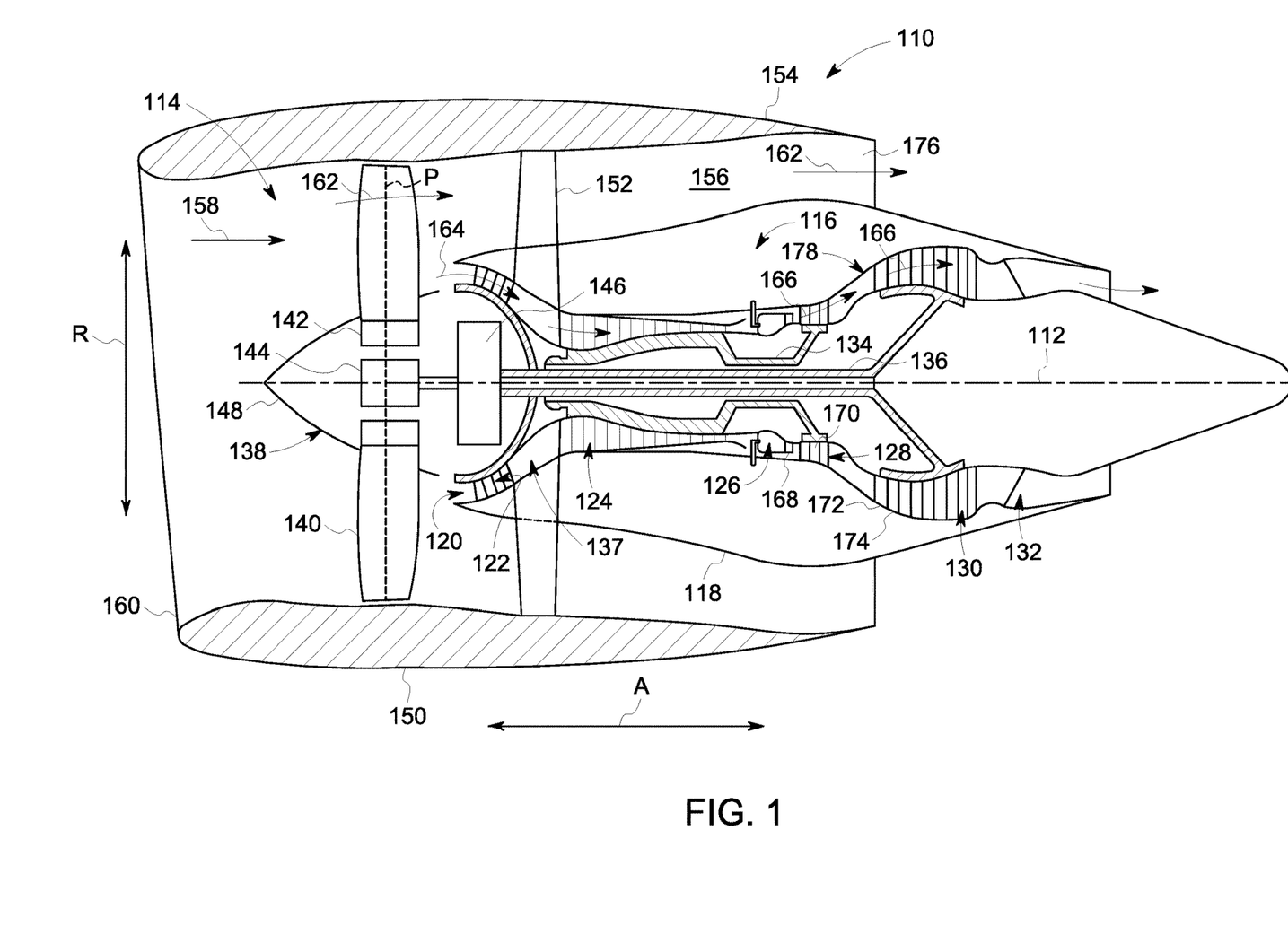
FIG. 1 is a schematic view of an exemplary gas turbine engine.

FIG. 1 is a schematic cross-sectional view of a gas turbine engine 110 in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 encases, in serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section 123, combustion section 126, turbine section, and nozzle section 132 together define a core air flowpath 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed. In an alternative embodiment, fan blade 140 is a fixed pitch fan blade rather than a variable pitch fan blade.

Also, in the exemplary embodiment, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween.

During operation of turbofan engine 110, a volume of air 158 enters turbofan engine 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate which causes power gear box 146 to rotate LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 1 is by way of example only, and that in other embodiments, turbofan engine 110 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine.

Figure 2:
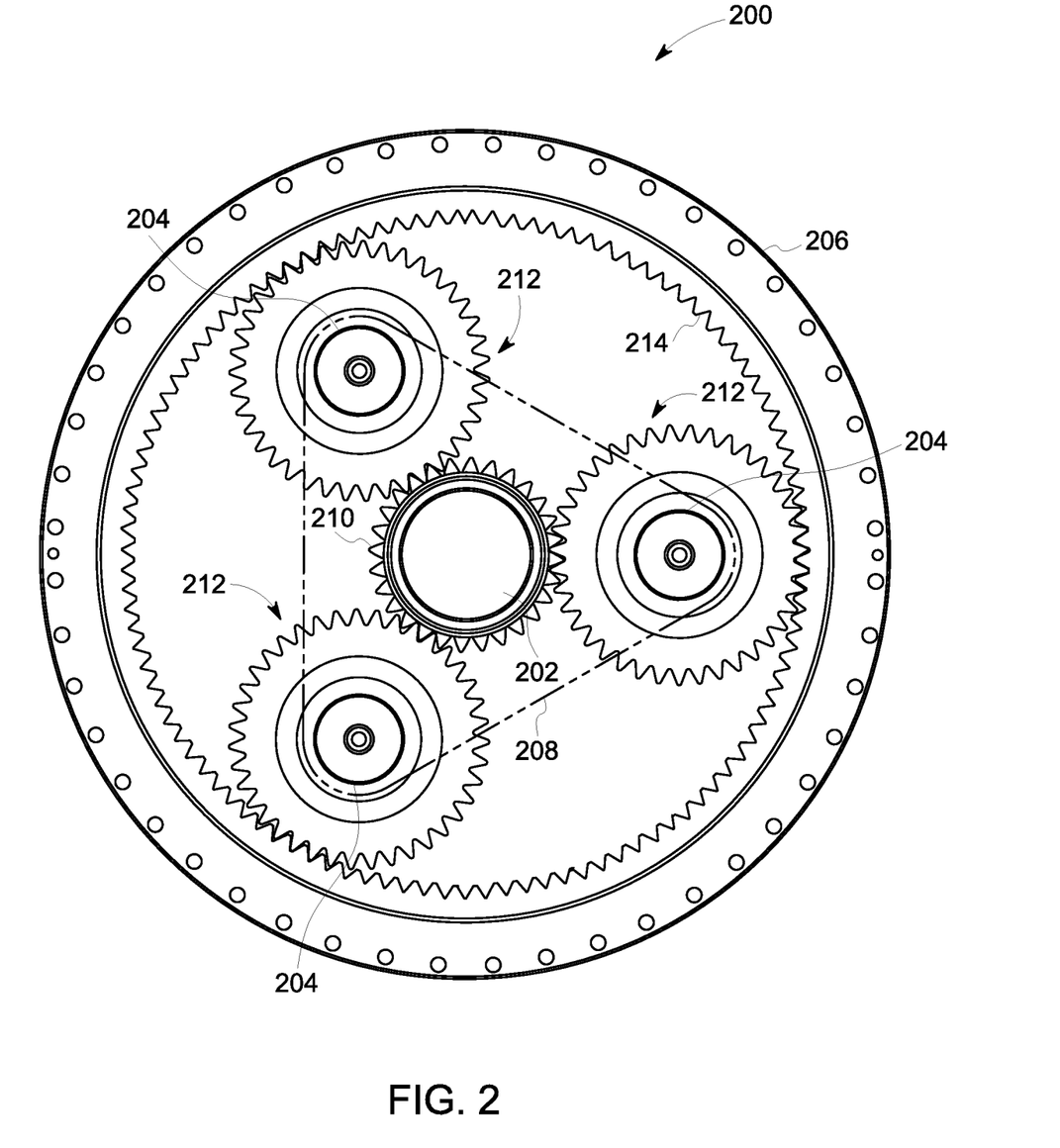
FIG. 2 is a schematic diagram of an exemplary epicyclic gear train that is used with the gas turbine engine shown in FIG. 1.

FIG. 2 is a schematic diagram of an epicyclic gear train 200. In the exemplary embodiment, epicyclic gear train 200 is a planetary gear train. In one embodiment, epicyclic gear train 200 is housed within power gearbox 146 (shown in FIG. 1). In other embodiments, epicyclic gear train 200 is located adjacent to power gearbox 146 and is mechanically coupled to it.

Epicyclic gear train 200 includes a sun gear 202, a plurality of planetary gears 204, a ring gear 206, and a carrier 208. In alternative embodiments, epicyclic gear train 200 is not limited to three planetary gears 204. Rather, any number of planetary gears may be used that enables operation of epicyclic gear train 200 as described herein. In some embodiments, LP shaft or spool 136 (shown in FIG. 1) is fixedly coupled to sun gear 202. Sun gear 202 is configured to engage planetary gears 204 through a plurality of complementary sun gear teeth 210 and a plurality of complementary planet gear teeth 212 circumferentially spaced about a radially outer periphery of sun gear 202 and a radially outer periphery of planetary gears 204 respectively. Planetary gears 204 are maintained in a position relative to each other using carrier 208. Planetary gears 204 are fixedly coupled to power gearbox 146. Planetary gears 204 are configured to engage ring gear 206 through a plurality of complementary ring gear teeth 214 and complementary planet gear teeth 212 circumferentially spaced about a radially inner periphery of ring gear 206 and a radially outer periphery of planetary gears 204 respectively. Ring gear 206 is rotationally coupled to fan blades 140 (shown in FIG. 1), disk 142 (shown in FIG. 1), and pitch change mechanism 144 (shown in FIG. 1) extending axially from ring gear 206. LP turbine 130 rotates the LP compressor 122 at a constant speed and torque ratio which is determined by a function of ring gear teeth 214, planet gear teeth 212, and sun gear teeth 210 as well as how power gearbox 146 is restrained.

Epicyclic gear train 200 can be configured in three configurations: planetary, star, and solar. In the planetary configuration, ring gear 206 remains stationary while sun gear 202, planetary gears 204, and carrier 208 rotate. LP shaft or spool 136 drives sun gear 202 which is configured to rotate planetary gears 204 that are configured to rotate carrier 208. Carrier 208 drives fan blades 140, disk 142, and pitch change mechanism 144. Sun gear 202 and carrier 208 rotate in the same direction.

In the star configuration, carrier 208 remains stationary while sun gear 202 and ring gear 206 rotate. LP shaft or spool 136 drives sun gear 202 which is configured to rotate planetary gears 204. Planetary gears 204 are configured to rotate ring gear 206 and carrier 208 is fixedly coupled to power gearbox 146. Carrier 208 maintains planetary gears 204 positioning while allowing planetary gears 204 to rotate. Ring gear 206 is rotationally coupled to fan blades 140, disk 142, and pitch change mechanism 144. Sun gear 202 and ring gear 206 rotate in opposite directions.

In the solar configuration, sun gear 202 remains stationary while planetary gears 204, ring gear 206, and carrier 208 rotate. LP shaft or spool 136 can drive either the ring gear 206 or carrier 208. When LP shaft or spool 136 is coupled to carrier 208, planetary gears 204 are configured to rotate ring gear 206 which drives fan blades 140, disk 142, and pitch change mechanism 144. Ring gear 206 and carrier 208 rotate in the same direction.

In the solar configuration where LP shaft or spool 136 is coupled to ring gear 206, ring gear 206 is configured to rotate planetary gears 204 and carrier 208. Carrier 208 drives fan blades 140, disk 142, and pitch change mechanism 144. Ring gear 206 and carrier 208 rotate in the same direction.

Figure 3:
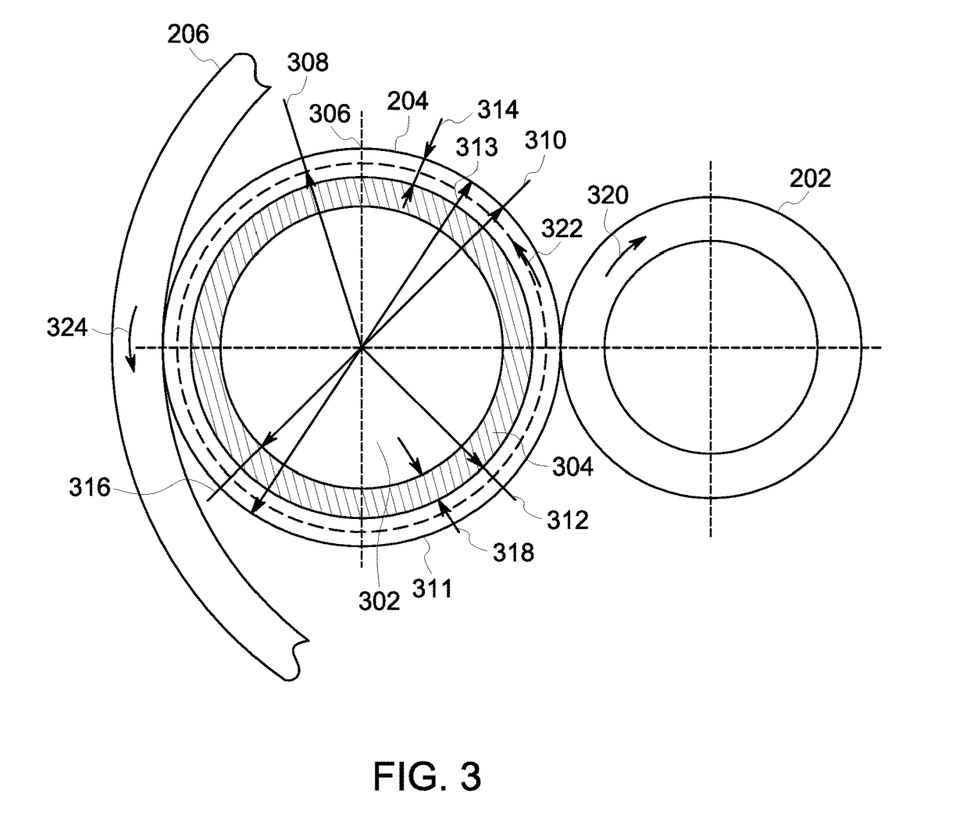
FIG. 3 is a partial cutaway schematic diagram of the epicyclic gear train shown in FIG. 2.

FIG. 3 is a partial schematic diagram of epicyclic gear train 200 in a star configuration. Planet gears 204 include a bearing pin 302, a fluid film 304, and a planet gear rim 306. Planet gear rim 306 includes a planet gear bending stress neutral axis radius 308, an outer radius or gear root radius 310, an inner radius 312, a diameter 313, and a thickness 314. Carrier 208 (shown in FIG. 2) is coupled to bearing pin 302. Fluid film 304 is disposed circumferentially around annular inner bearing ring 302. Planet gear rim 306 circumscribes fluid film 304. A plurality of teeth (shown in FIG. 2) are disposed circumferentially about an outer surface 311. Planet gear bending stress neutral axis radius 308 is the radius where the stresses and strains within planet gear rim 306 are zero when bending forces are applied to planet gear 204. Thickness 314 is the radial distance between outer radius 310 and inner radius 312. Bearing pin 302 includes a bearing pin radius 316. Planet gears 204 further include a clearance 318 which is the radial distance between bearing pin radius 316 and inner radius 312. Planet gears 204 also include a width (not shown) extending in axial direction A.

Planet gear 204 includes at least one material selected from a plurality of alloys including, without limitation, ANSI M50 (AMS6490, AMS6491, and ASTM A600), M50 Nil (AMS6278), Pyrowear 675 (AMS5930), Pyrowear 53 (AMS6308), Pyrowear 675 (AMS5930), ANSI9310 (AMS6265), 32CDV13 (AMS6481), ceramic (silicon nitride), Ferrium C61 (AMS6517), and Ferrium C64 (AMS6509). Additionally, in some embodiments, the metal materials may be nitrided to improve the life and resistance to particle damages. Planet gear 204 includes any combination of alloys and any percent weight range of those alloys that facilitates operation of planet gear 204 as described herein, including, without limitation combinations of M50 Nil (AMS6278), Pyrowear 675 (AMS5930), and Ferrium C61 (AMS6517). Planet gear 204 has a Young's modulus of elasticity which is dependent on the material used to construct planet gear 204. The Young's modulus of elasticity is defined as the ratio of the stress (force per unit area) along an axis to the strain (ratio of deformation over initial length) along that axis in the range of stress in which Hooke's law holds.

During operation, in the exemplary embodiment, LP power shaft 136 rotates and applies a torque to sun gear 202 in a clockwise direction as indicated by arrow 320. Sun gear 202, in turn, rotates and applies a torque to planet gear 204 in a counter-clockwise direction as indicated by arrow 322. Planet gear rim 306 rotates around fluid film 304 and bearing pin 302. Planet gear 204, in turn, rotates and applies a torque to ring gear 206 in a counter-clockwise direction as indicated by arrow 324.

Figure 4:
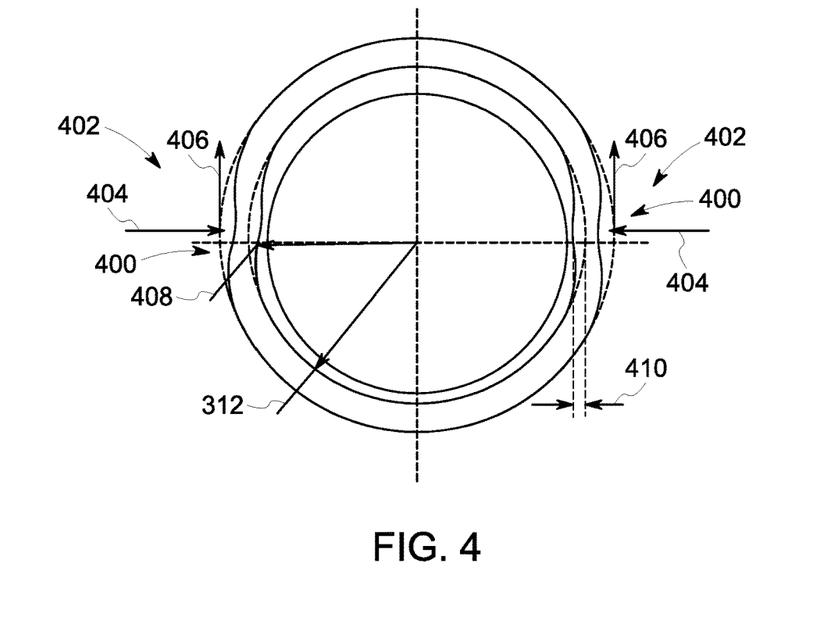
FIG. 4 is a schematic diagram of the planet gear shown in FIG. 3 with resultant tangential and radial forces causing the planet gear rim to deflect.

FIG. 4 is a schematic diagram of planet gear 204 (shown in FIG. 3) with resultant radial and transverse forces causing a deformation 400 of planet gear rim 306. Torsional movement of LP power shaft 136 cause sun gear 202 (shown in FIG. 3) and ring gear 206 (shown in FIG. 3) to exert resultant radial and transverse components of gear tooth forces 402 on planet gear rim 306. Resultant radial and transverse components of gear tooth forces 402 are equal in magnitude and represent the load through teeth 212 (shown in FIG. 2) from sun gear 202 on one side and from the ring gear 206 on the other side.

Resultant radial and transverse components of gear tooth forces 402 include resultant radial component forces 404 and resultant tangential component forces 406. Resultant radial component forces 404 are equal and opposite respective radial components of resultant radial and transverse components of gear tooth forces 402. Resultant tangential component forces 406 are equal respective tangential components of tooth contact forces 402. Resultant radial and transverse components of gear tooth forces 402 cause a deformation or bending 400 of planet gear rim 306. The deformation or bending 400 of planet gear rim 306 is caused by both resultant tangential component forces 406 pulling down and resultant radial component forces 404 pushing in.

The deformation or bending of planet gear rim 306 bends planet gear rim 306 toward bearing pin 302 such that inner radius 312 is reduced to a deformed inner radius 408. Additionally, clearance 318 is reduced by a change in clearance 410 which is the radial distance between inner radius 312 and deformed inner radius 408.

Enhanced results are achieved when clearance 318 is greater than change in clearance 410. That is, enhanced results are achieved when planet gear rim 306 does not deform or bend such that planet gear rim 306 touches or pinches bearing pin 316 when resultant radial and transverse components of gear tooth forces 402 are exerted on planet gear rim 306. As such, planet gear rim 306 is designed to maintain clearance 318 greater than change in clearance 410. As such, a gear pinch ratio (shown in equation (1) below) of planet gear rim 306 is defined as the ratio of change in clearance 410 and clearance 318. The gear pinch ratio must be less than 1 for clearance 318 to remain greater than change in clearance 410. The gear pinch ratio is further defined as an expression of planet gear bending stress neutral axis radius 308, resultant radial component forces 404, thickness 314, the width of planet gear 204, clearance 318, change in clearance 410, and the Young's Modulus of elasticity of planet gear rim 306.

The expression for generating the gear pinch ratio $\Gamma$ is given by:

$$\Gamma = \frac{\Delta c}{c} = \left[\frac{R^3 \cdot F_r}{T^3 \cdot w \cdot c}\right] \cdot \left[\frac{3(\pi^2 - 8)}{E \cdot 2\pi}\right] \quad (1)$$

wherein the variable "R" is defined as planet gear bending stress neutral axis radius 308, the variable "$F_r$" is defined as resultant radial component forces 404, the variable "T" is defined as thickness 314, the variable "w" is defined as the width of planet gear 204, the variable "c" is defined as clearance 318, the variable "$\Delta c$" is defined as change in clearance 410, the variable "E" is defined as the Young's Modulus of elasticity, and the variable "$\Gamma$" is defined as the gear pinch ratio. Typically, values for $F_r$ and R are based on requirements of gas turbine engine 110. Thus, in order to manufacture planet gear 204 such that $\Gamma$ is less than 1, T, w, c, and the material of planet gear rim 306 (the material of construction defines E), may be varied to adjust $\Gamma$. A clearance ratio is defined as clearance 318 over diameter 313. In the exemplary embodiment, clearance ratio includes values in a range from and including about 0.0005 inches of clearance 318 per inch of diameter 313 to and including about 0.003 inches of clearance 318 per inch of diameter 313. However, clearance ratio includes any value which enables planet gear rim 306 to operate as described herein. In the exemplary embodiment, enhanced results are achieved when $\Gamma$ includes values less than or equal to about 1. In another embodiment, $\Gamma$ includes values in a range from and including about 0.1 to and including about 0.9. In another embodiment, $\Gamma$ includes values in a range from and including about 0.25 to and including about 0.75.

Figure 5:
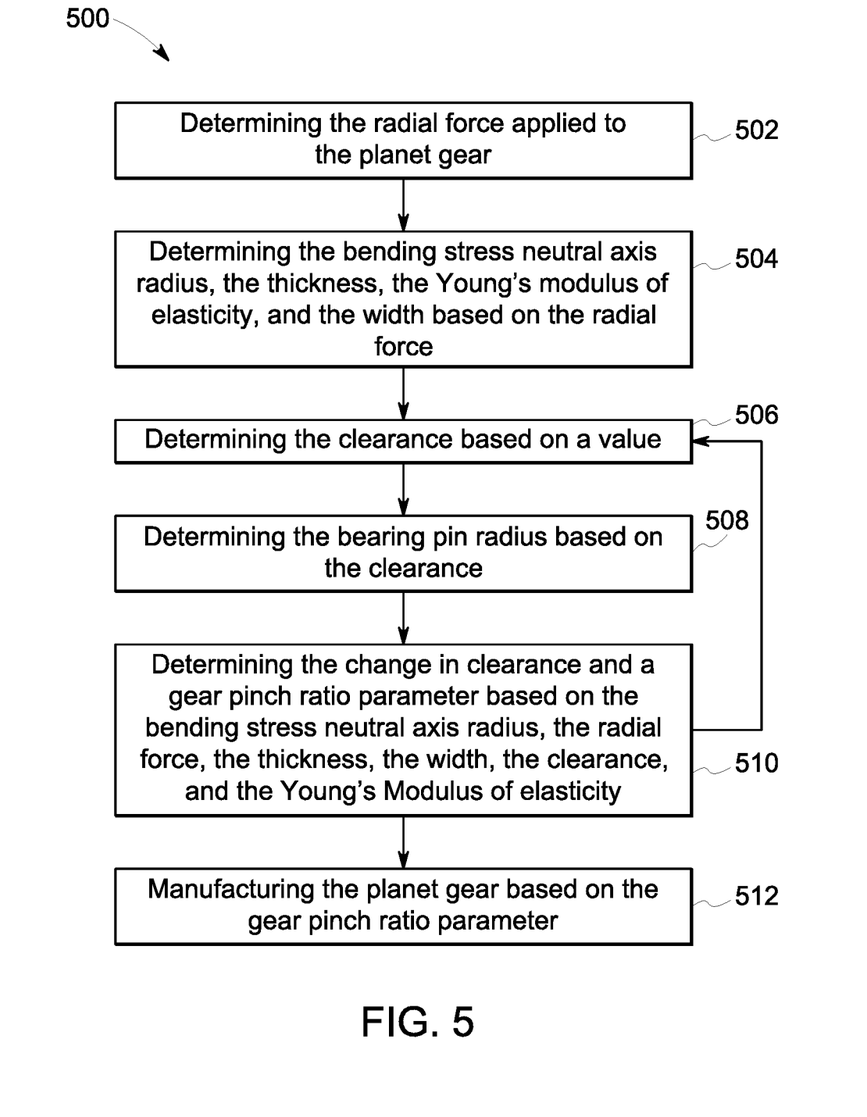
FIG. 5 is a flow diagram of a method of manufacturing the planet gear shown in FIG. 4.

FIG. 5 is a flow diagram of a method 500 of manufacturing planet gear 204 (shown if FIG. 2). Method 500 includes determining 502 resultant radial component forces 404 (shown if FIG. 4) applied to planet gear 204. Method 500 also includes determining 504 planet gear bending stress neutral axis radius 308 (shown if FIG. 3), thickness 314 (shown if FIG. 3), the Young's Modulus of elasticity of planet gear rim 306 (shown if FIG. 3), and the width of planet gear 204 based on resultant radial component forces 404 (shown if FIG. 4). Method 500 further includes determining 506 clearance 318 (shown if FIG. 3) based on an initial value or the results of step 508. Method 500 also includes determining 508 bearing pin radius 316 (shown if FIG. 3) based on clearance 318. Method 500 further includes determining 510 change in clearance 410 (shown if FIG. 4) and the gear pinch ratio based on planet gear bending stress neutral axis radius 308 (shown if FIG. 3), resultant radial component forces 404, thickness 314, the width of planet gear 204, clearance 318, and the Young's Modulus of elasticity of planet gear rim 306 using equation (1). If the gear pinch ratio is greater than 1 or outside a predetermined range of values, a new clearance 318 is determined in step 506 based on the results of step 510. If the gear pinch ratio is less than 1 or within a predetermined range of values, manufacturing 512 planet gear 204 based on the gear pinch ratio.

The above-described planet gear provides an efficient method for managing torsional forces in a turbomachine. Specifically, the planet gear includes a planet gear rim circumscribing a journal or fluid film bearing. The journal or fluid film bearing includes a pin circumscribed by the planet gear rim and a fluid disposed between the pin and the planet gear rim. The distance between the pin and the planet gear rim is defined as the clearance. The planet gear rim rotates about the journal or fluid film bearing. A plurality of gear teeth is disposed circumferentially about an outer radial surface of the planet gear rim. A sun gear and a low pressure power shaft are configured to rotate the planet gear through a plurality of complementary teeth circumferentially spaced about a radially outer periphery of the sun gear. The low pressure power shaft exerts torsional forces on the sun gear which exerts forces through the planet gear balanced by equal and opposite forces on the ring gear and creates a reaction force through the rolling elements and the pin. The planet gear rim of deflects and deforms due to the torsional forces. The planet gear described herein has been cooperatively designed with the journal or fluid film bearing to maintain the clearance above zero when torsional loads are exerted on the planet gear. Maintaining the clearance above zero improves the load capacity, reduces heat generation, and increases the reliability of the planet gear and the power gear box. Furthermore, the planet gear described herein reduces the weight of the aircraft by reducing the amount of material in the planet gear.

An exemplary technical effect of the methods, systems, and apparatus described herein includes at least one of: (a) decreasing the stress and strain on the planet gear rim; (b) maintaining a clearance between a pin and a planet gear rim above zero; (c) increasing the reliability of the planet gear bearings; and (d) decreasing the weight of the aircraft engine.

Exemplary embodiments of the planet gear are described above in detail. The planet gear, and methods of operating such units and devices are not limited to the specific embodiments described herein, but rather, components of systems and/or steps of the methods may be utilized independently and separately from other components and/or steps described herein. For example, the methods may also be used in combination with other systems for managing torsional forces in a turbomachine, and are not limited to practice with only the systems and methods as described herein. Rather, the exemplary embodiment may be implemented and utilized in connection with many other machinery applications that require planet gears.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A planet gear comprising:
a pin having a pin radius, said pin comprising a pin outer surface;
a fluid film disposed circumferentially about said pin;
an annular planet gear rim disposed circumferentially about said fluid film and said pin, said annular planet gear rim having an inner radius, a diameter, and an outer radius, said annular planet gear rim comprising an inner surface and an outer surface, said inner surface and said pin outer surface defining a clearance therebetween, wherein the clearance is greater than 0 when a radial force is applied to said planet gear, wherein said fluid film allows said annular planet gear rim to rotate around said pin and allows said annular planet gear rim to deform when the radial force is applied to said planet gear.

2. The planet gear of claim 1 further comprising a bearing, wherein said annular planetary gear rim is disposed circumferentially about said bearing.

3. The planet gear of claim 2, wherein said bearing comprises a journal bearing.

4. The planet gear of claim 1, wherein the inner radius and the outer radius define a rim thickness therebetween, said annular planet gear rim further having a bending stress neutral axis, a width, a Young's Modulus, and a gear pinch ratio, wherein the gear pinch ratio is defined by $$\Gamma = \left[\frac{R^3 \cdot F_r}{T^3 \cdot w \cdot c}\right] \cdot \left[\frac{3(\pi^2 - 8)}{E \cdot 2\pi}\right]$$

wherein "R" is the bending stress neutral axis radius, "$F_r$" is the radial force, "T" is the rim thickness, "w" is the width, "c" is the clearance, "E" is the Young's Modulus, and "Γ" is the gear pinch ratio, wherein the gear pinch ratio is less than or equal to about 1.

5. The planet gear of claim 4, wherein the gear pinch ratio includes values in a range from and including about 0.1 to and including about 0.9.

6. The planet gear of claim 4, wherein the gear pinch ratio includes values in a range from and including about 0.25 to and including about 0.75.

7. The planet gear of claim 1, wherein a clearance ratio is defined as the clearance divided by the diameter, wherein the clearance ratio includes values in a range from and including about 0.0005 inches of the clearance per inch of the diameter to and including about 0.003 inches of the clearance per inch of the diameter.

8. A gear assembly comprising:
a sun gear;
a ring gear; and
a plurality of planet gears coupled to said ring gear and said sun gear, each planet gear of said plurality of planet gears comprising:
a pin having a pin radius, said pin comprising a pin outer surface;
a fluid film disposed circumferentially about said pin;
an annular planet gear rim disposed circumferentially about said fluid film and said pin, said annular planet gear rim having an inner radius, a diameter, and an outer radius, said annular planet gear rim comprising an inner surface and an outer surface, said inner surface and said pin outer surface defining a clearance therebetween, wherein the clearance is greater than 0 when a radial force is applied to said planet gear, wherein said fluid film allows said annular planet gear rim to rotate around said pin and allows said annular planet gear rim to deform when the radial force is applied to said planet gear.

9. The gear assembly of claim 8 further comprising a bearing, wherein said annular planetary gear rim is disposed circumferentially about said bearing.

10. The gear assembly of claim 9, wherein said bearing comprises a journal bearing.

11. The gear assembly of claim 8, wherein the inner radius and the outer radius define a rim thickness therebetween, said annular planet gear rim further having a bending stress neutral axis radius, a width, a Young's Modulus, and a gear pinch ratio, wherein the gear pinch ratio is defined by $$\Gamma = \left[\frac{R^3 \cdot F_r}{T^3 \cdot w \cdot c}\right] \cdot \left[\frac{3(\pi^2 - 8)}{E \cdot 2\pi}\right]$$

wherein "R" is the bending stress neutral axis radius, "$F_r$" is the radial force, "T" is the rim thickness, "w" is the width, "c" is the clearance, "E" is the Young's Modulus, and "Γ" is the gear pinch ratio, wherein the gear pinch ratio is less than or equal to about 1.

12. The planet gear of claim 11, wherein the gear pinch ratio includes values in a range from and including about 0.1 to and including about 0.9.

13. The planet gear of claim 11, wherein the gear pinch ratio includes values in a range from and including about 0.25 to and including about 0.75.

14. The gear assembly of claim 11, wherein said sun gear, said plurality of planet gears, and said ring gear define a planetary configuration, wherein said sun gear is configured to rotate said plurality of planet gears, and wherein said ring gear is configured to remain stationary.

15. The gear assembly of claim 11, wherein said sun gear, said plurality of planet gears, and said ring gear define a star configuration, wherein said sun gear is configured to rotate said plurality of planet gears, and wherein said plurality of planet gears are configured to rotate said ring gear.

16. The gear assembly of claim 11, wherein said sun gear, said plurality of planet gears, and said ring gear define a solar configuration, wherein said sun gear is configured to remain stationary, and wherein said plurality of planet gears are configured to rotate said ring gear.

17. The gear assembly of claim 8, wherein a clearance ratio is defined as the clearance divided by the diameter, wherein the clearance ratio includes values in a range from and including about 0.0005 inches of the clearance per inch of the diameter to and including about 0.003 inches of the clearance per inch of the diameter.

* * * * *